US008341247B2

(12) United States Patent
Shkedi

(10) Patent No.: US 8,341,247 B2
(45) Date of Patent: *Dec. 25, 2012

(54) REQUESTING OFFLINE PROFILE DATA FOR ONLINE USE IN A PRIVACY-SENSITIVE MANNER

(75) Inventor: Roy Shkedi, New York, NY (US)

(73) Assignee: Almondnet, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,409

(22) Filed: Jun. 15, 2012

(65) Prior Publication Data

US 2012/0254371 A1    Oct. 4, 2012

Related U.S. Application Data

(63) Continuation of application No. 13/024,217, filed on Feb. 9, 2011, now Pat. No. 8,204,965, which is a continuation of application No. 12/688,731, filed on Jan. 15, 2010, now Pat. No. 7,890,609.

(60) Provisional application No. 61/144,969, filed on Jan. 15, 2009.

(51) Int. Cl.
*G06F 15/16* (2006.01)

(52) U.S. Cl. ......................................... 709/219; 709/245

(58) Field of Classification Search ................. 709/219, 709/245; 705/14.4, 14.49, 14.51, 14.53
See application file for complete search history.

(56) References Cited

U.S. PATENT DOCUMENTS

| | | | |
|---|---|---|---|
| 5,754,939 A | 5/1998 | Herz et al. | |
| 5,855,008 A | 12/1998 | Goldhaber et al. | |
| 5,918,014 A | 6/1999 | Robinson | |
| 5,933,811 A | 8/1999 | Angles et al. | |
| 6,009,410 A | 12/1999 | LeMole et al. | |
| 6,055,573 A | 4/2000 | Gardenswartz et al. | |
| 6,073,241 A | 6/2000 | Rosenberg et al. | |
| 6,134,532 A | 10/2000 | Lazarus et al. | |
| 6,141,010 A | 10/2000 | Hoyle | |
| 6,298,330 B1 | 10/2001 | Gardenswartz et al. | |
| 6,366,298 B1 | 4/2002 | Haitsuka et al. | |
| 6,415,322 B1 | 7/2002 | Jaye | |
| 6,832,207 B1 | 12/2004 | Shkedi | |
| 6,925,440 B1 | 8/2005 | Shkedi | |
| 6,973,436 B1 | 12/2005 | Shkedi | |
| 6,983,379 B1 | 1/2006 | Spalink et al. | |
| 7,013,290 B2 | 3/2006 | Ananian | |
| 7,051,351 B2 | 5/2006 | Goldman et al. | |
| 7,072,853 B2 | 7/2006 | Shkedi | |
| 7,188,085 B2 | 3/2007 | Pelletier | |
| 7,360,251 B2 | 4/2008 | Spalink et al. | |
| 7,428,493 B2 | 9/2008 | Shkedi | |
| 7,454,364 B2 | 11/2008 | Shkedi | |
| 7,698,422 B2 | 4/2010 | Vanderhook et al. | |
| 7,725,944 B2 | 5/2010 | Spalink et al. | |
| 7,747,745 B2 | 6/2010 | Shkedi | |
| 7,822,637 B2 | 10/2010 | Shkedi | |
| 7,822,639 B2 | 10/2010 | Shkedi | |
| 7,861,260 B2 | 12/2010 | Shkedi | |
| 7,890,609 B2 * | 2/2011 | Shkedi | 709/219 |
| 7,979,307 B2 | 7/2011 | Shkedi | |
| 8,015,286 B2 | 9/2011 | Jenkins | |
| 8,036,929 B1 | 10/2011 | Reisman | |
| 8,051,444 B2 | 11/2011 | Shkedi | |
| 8,145,754 B2 * | 3/2012 | Chamberlain et al. | 709/224 |
| 8,200,822 B1 | 6/2012 | Shkedi | |
| 8,204,783 B2 | 6/2012 | Shkedi | |
| 8,204,965 B2 * | 6/2012 | Shkedi | 709/219 |
| 2002/0002541 A1 | 1/2002 | Williams | |
| 2002/0072965 A1 | 6/2002 | Merriman et al. | |
| 2002/0104090 A1 | 8/2002 | Stettner | |
| 2002/0112013 A1 | 8/2002 | Walsh | |
| 2002/0123928 A1 | 9/2002 | Eldering et al. | |
| 2002/0124253 A1 | 9/2002 | Eyer et al. | |
| 2003/0051242 A1 | 3/2003 | Donnelly | |
| 2003/0145323 A1 | 7/2003 | Hendricks et al. | |
| 2003/0187949 A1 | 10/2003 | Bhatt et al. | |
| 2004/0073915 A1 | 4/2004 | Dureau | |
| 2005/0165643 A1 | 7/2005 | Wilson et al. | |

(Continued)

FOREIGN PATENT DOCUMENTS

WO    WO2005/046237    5/2005

OTHER PUBLICATIONS

Engage Technologies, Inc.; Form S-1A; filed with the SEC; pp. 36-50; Jul. 19, 1999.

(Continued)

*Primary Examiner* — Douglas Blair
(74) *Attorney, Agent, or Firm* — Louis J. Hoffman; David S. Alavi

(57) ABSTRACT

A method, performed using one or more servers under the control of an ISP, comprises: (a) receiving an electronic transmission from a requesting server of an IP address and a time and date; (b) automatically determining to which subscriber of the ISP the received IP address was allocated at the received time and date; and (c) automatically transmitting an electronic communication that causes delivery to the requesting server of offline data originating from an offline data provider. The delivered offline data concern the subscriber determined to have been allocated the received IP address at the received time and date. The communication does not convey to the offline data provider the subscriber's history of online activity, and the delivery does not convey to the requesting server a personal identity of the subscriber.

12 Claims, No Drawings

U.S. PATENT DOCUMENTS

| | | | |
|---|---|---|---|
| 2006/0070117 A1 | 3/2006 | Spalink et al. | |
| 2006/0271425 A1 | 11/2006 | Goodman et al. | |
| 2007/0088713 A1 | 4/2007 | Baxter et al. | |
| 2007/0294721 A1 | 12/2007 | Haeuser et al. | |
| 2008/0004884 A1 | 1/2008 | Flake et al. | |
| 2008/0005313 A1 | 1/2008 | Flake et al. | |
| 2008/0133342 A1 | 6/2008 | Criou et al. | |
| 2008/0243531 A1 | 10/2008 | Hyder et al. | |
| 2008/0243593 A1 | 10/2008 | Ko et al. | |
| 2008/0243822 A1 | 10/2008 | Campbell et al. | |
| 2008/0270233 A1 | 10/2008 | Yip et al. | |
| 2008/0281711 A1 | 11/2008 | Bridges et al. | |
| 2009/0049468 A1 | 2/2009 | Shkedi | |
| 2009/0049469 A1 | 2/2009 | Small et al. | |
| 2009/0129377 A1 | 5/2009 | Chamberlain et al. | |
| 2009/0132366 A1 | 5/2009 | Lam et al. | |
| 2009/0132559 A1 | 5/2009 | Chamberlain et al. | |
| 2009/0164470 A1 | 6/2009 | Savage et al. | |
| 2009/0248661 A1 | 10/2009 | Bilenko et al. | |
| 2009/0300675 A1 | 12/2009 | Shkedi | |
| 2010/0198705 A1 | 8/2010 | Spalink et al. | |
| 2010/0299431 A1 | 11/2010 | Vanderhook et al. | |
| 2011/0167043 A1 | 7/2011 | Hintze et al. | |
| 2011/0202379 A1 | 8/2011 | Srinivasan | |
| 2011/0289190 A1 | 11/2011 | Chamerlain et al. | |
| 2012/0066385 A1* | 3/2012 | Jenkins | 709/225 |
| 2012/0185503 A1* | 7/2012 | Chamberlain et al. | 707/769 |

OTHER PUBLICATIONS

Chen, Andy; "Behavioral Matchmaking, Part 3: GPS and Behavioral Targeting"; from website http://www.clickz.com; Nov. 24, 2004.
Battelle, John; "The Search—How Google and Its Rivals Rewrote the Rules of Business and Transformed Our Culture"; pp. 167-171; 2005.
"BSkyB in Google Link-up"; Financial Times (FT.com); Dec. 6, 2006.
"Google moves into TV ads with BSkyB Deal"; Guardian Unlimited; Dec. 7, 2006.
Chen, Andy; "The New Behavioral Wunder"; from webpage http://www.clickz.com; Apr. 11, 2007.
"NetZero Launches Ad-Backed Access Service"; from website www.clickz.com; Oct. 20, 1998.
"Nissan, BellSouth, Music Blvd. Among Latest Advertisers to Sign Up With NetZero"; press release from www.irconnect.com; Nov. 16, 1998.
"LookSmart and NetZero Extend and Enhance Winning Partnership"; press release found on www.shareholder.com; Feb. 9, 2000.
"NetZero Guarantees Increase in Web Site Traffic for New Adverstisers"; press release from www.irconnect.com; circa 2000.
Keegan, Paul; "The Man Who Can Save Advertising"; from http://money.cnn.com; Nov. 1, 2004.
"Visible World Targets Advertising Industry"; from http://informitv.com; Feb. 20, 2005.
FAQ from Zango Ad Services; http://adservices.zango.com; 2007.
Shukla, Anuradha; "Visible World Offers 'Any Screen' Solution for Customized Video Advertising"; from www.tmcnet.com; Feb. 6, 2007.
Story, Louise; "The Web drives an advertising boom without the need for agencies"; International Herald Tribune (iht.com); Feb. 8, 2007.
Hunt, Timothy J., "Moving Target", Financial Post, Oct. 1, 2000.
Luening, E.; "Free ISP NetZero beefs up ad services"; web page at http://www.news.com/Free-ISP-NetZero-beefs-up-ad-services/2100-1023_3-241067.html; Jan. 2, 2002.
Bergstein, B.; "Ad-targeted System Monitors Your Interests with ISP's Help"; from website www.siliconvalley.com; Dec. 10, 2007.
White, B.; "Watching What You See on the Web"; Wall Street Journal Online; Dec. 6, 2007.
"What's New: The Latest on Technology Deals"; from Dow Jones VentureWire; as published on Wall Street Journal Online; Oct. 22, 2007.

\* cited by examiner

REQUESTING OFFLINE PROFILE DATA FOR ONLINE USE IN A PRIVACY-SENSITIVE MANNER

CROSS-REFERENCE TO RELATED APPLICATIONS

This application is a continuation of application Ser. No. 13/024,217, filed Feb. 9, 2011, now U.S. Pat. No. 8,204,965, which is a continuation of application Ser. No. 12/688,731, filed Jan. 15, 2010, now U.S. Pat. No. 7,890,609, which claims benefit of U.S. provisional application Ser. No. 61/144,969 filed Jan. 15, 2009 in the name of Roy Shkedi, said provisional application being hereby incorporated by reference as if fully set forth herein.

BACKGROUND

When an online server computer (e.g., a server hosting an online site) is accessed by a user using a networked computer or other online user interface device (e.g., by a user visiting the online site), that accessed server often places (or causes to be placed) a cookie on the user's computer to enable the online server to recognize that user's computer during subsequent access of the online server. The cookie might include only an IP address, time, and date (IP/T/D) that corresponds to the user's access, an additional or alternative cookie identifier, or more detailed information pertaining to the user's access of the online server. Instead of (or in addition to) including such additional information in the cookie itself, the information can be stored by the online server along with a reference to the cookie (by the IP/T/D or by a cookie identifier included in the cookie). Upon subsequent access of the online server by the user's computer, the server can recognize, by reading the cookie, the computer as having previously accessed the server (with or without placing another cookie or modifying the existing cookie). The cookie placement and subsequent recognition of the cookie are typically performed automatically under the control of programming code on the online server.

Instead of, or in addition to, placing its own cookie on the user's computer, the accessed server can redirect the accessing user's computer to another online server (i.e., a so-called redirect server) that can place a cookie on the user's computer or recognize a cookie that it placed previously, thereby allowing the redirect server to recognize the user's computer upon subsequent redirects. The redirect can include information concerning the user's access of the redirecting server. A redirect server can further redirect the user's computer to yet another redirect server; the term "redirect server" can denote any one of such a sequence of redirect servers. The user typically is not directly aware of the redirect or cookie placement, which is typically performed automatically under the control of programming code on the redirect or accessed server, respectively. An example is a so-called "web beacon," which is also known in the industry as a 1×1 pixel, web bug, single-pixel GIF, pixel tag, smart tag, action tag, clear GIF, tracer, 1×1 GIF, or a cookie anchor. Such web beacons are often implemented as a single-pixel image that can be inconspicuously located on a web page or in an email; the user's computer is redirected to a redirect server to retrieve the image, enabling the redirect server to receive the cookie identifier from the accessed site or to place its own cookie on the user's computer. In some instances the user's computer can be directed to a redirect server under the direction of programming code on the user's computer (so-called adware).

In some instances, a redirecting server can send along its own cookie identifier when redirecting the user's computer to another redirect server. That allows the redirect server to associate its own cookie identifier with the redirecting server cookie identifier in a process is known as "cookie matching." Upon a subsequent encounter between the user's computer and the redirecting server, the redirecting server need not redirect the user's computer to the redirect server. Instead, the redirecting server can directly transmit to the redirect server, along with the redirecting cookie identifier, newly gathered information concerning the user's computer. Because the redirect server previously cookie-matched its own cookie identifier with the redirecting server's cookie identifier, the redirect server can associate the transmitted, newly gathered information with its own cookie identifier. That information can be used for targeting online advertising or can be further aggregated or distributed to other servers. The cookie-matched information transmitted from the redirecting server to the redirect server can be transmitted on a per-user basis, or a file (e.g., a log file) can be transmitted that includes such information for multiple users. Cookie matching can reduce the number of redirects of a user's computer or by a redirecting server. Using its own cookie on the user's computer, the redirect server can also recognize the user's computer upon a subsequent encounter between the user's computer and the redirect server.

The server directly accessed by the user, or any server to which the user's computer was redirected, can use the cookies (and the information included in or associated with them) to form a profile associated with the user's computer that can in turn be used in a variety of ways. Based on the profile, the accessed or redirect server can select or deliver online advertising to the user via the user's computer, or can cause another online server to select or deliver such advertising; either scenario shall be encompassed by the phrase "selecting or delivering" an advertisement. The online advertising can be selected and delivered immediately, during the user's current online session, or can be selected and delivered later, during subsequent online sessions when the cookie placed on the user's computer is recognized by the accessed server or the redirect server. Instead of (or in addition to) providing advertising, the accessed or redirect server can collect user data from other online servers, can distribute user data to other online servers, or can aggregate user data. Selecting or delivering online advertising, or collecting, aggregating, or distributing collected user data, is typically performed automatically under the control of programming code on the relevant server.

Online advertising selected for delivery to the user can be generic, but it is typically preferable to deliver online advertising that is targeted at the user (or at least the user's computer). Targeting of online advertising based on online behavior can be done in a variety of ways. The directly accessed online server can select and deliver online advertising to the user's computer based on the user's activity at an online site, which activity is monitored by that server during that online session. For example, a server for an online travel site can deliver online ads for hotels or rental cars in a particular geographic area during a session when a user searches for plane tickets to that area. The directly accessed online server can also (or instead) deliver targeted online ads during a current online session based on the user's activity at the server during a previous online session. For example, a user can purchase during a previous online session a particular movie from an online seller of music and video through that seller's online server. During a subsequent online session when the user accesses the music/video seller's server, that server can deliver an online ad for the corresponding movie soundtrack or for other movies related to the purchased one (by common actors, subject matter, purchases by other customers, and so on).

Targeted online advertisements can also (or instead) be selected or delivered by a redirect server (with the redirect arising from the accessed server or another redirect server). The two previous examples can be implemented with a redirect server selecting or delivering the targeted online ads during a user's online session at the redirecting accessed online server. However, a typical redirect server can receive redirects from a multitude of online servers, enabling the redirect server to recognize online activity at multiple online sites served by corresponding servers that can be associated with the same user computer (through recognition or updating of the redirect server's cookie at each subsequent redirect). The redirect server can therefore select or deliver online advertising to a user during an online session at one accessed online server based on the user's online activity at another accessed online server (during the same online session or during a previous online session). Alternatively, the redirect server can collect, aggregate, or distribute the online user data and pass the data along to another server that selects or delivers online advertising. There can be a sequence of any number of intermediate servers that collect, aggregate, and distribute online user data.

Various types of online entities operate redirect servers for facilitating targeting and delivery of online advertising. Examples of such online advertising entities include but are not limited to online ad space sellers, online ad space buyers, online data aggregators, online data distributors, or entities acting as any combination of those. Such entities can operate servers that are directly accessed by users as well as redirect servers.

Conventional methods for targeting online advertising based on online behavior can be implemented without using personally identifiable information. Tracking of online activity and targeting the online ads based on that activity can be accomplished using only cookies or static IP addresses or adware, without knowledge of the identity of the computer user accessing the online servers (or without knowledge of the identity of the subscriber whose online access device is used for accessing the online servers). Accessed online servers typically do not have access to personally identifiable information unless that information is supplied by the user while interacting with an online site controlled by the server, and operators of accessed online sites typically are not permitted to convey that information to third parties without explicit consent of the user (i.e., without user opt-in). A provider of online access (i.e., an Internet service provider, a/k/a an ISP) can track and record all online activity and associate that tracking information with the identity of a subscriber. However, current public and industry policy generally prohibits such tracking of online activity by ISP's, associating that activity with a particular user or subscriber, or conveying such information to third parties without opt-in. Even if legal, privacy policies and business practices of avoiding controversy counsel in favor of avoiding such tracking of information that reveals or allows exposure of personally identifiable information.

It would be advantageous to target online advertising based not only on online activity originating from the user's computer, but also on the user's "offline" activities and characteristics (i.e., activities not performed using access through a computer network, or characteristics not necessarily discernable by an online site). Such offline characteristics and activities can include, but are not limited to, city/state/country of residence, home or automobile ownership, employment status, job description, marital or family status, income level, products purchased offline (phone order, mail order, or in-store), credit score, memberships, political or religious affiliations, or other demographic or behavioral information about a subscriber. Data of those sorts are referred to herein as "offline data" to contrast with "online data" arising from a user's online activity. Vast amounts of offline data, for example, are already amassed, for a majority of consumers in the U.S., by credit-reporting bureaus such as Experian, TransUnion, and Equifax. Retailers also collect and maintain offline databases concerning their customers and those customers' shopping histories. Organizations collect and maintain databases of members, supporters, or contributors. All such collectors or owners of offline data are referred to herein as "offline data providers." Offline data is conventionally used to target print, mail, and phone advertising to consumers (i.e., "offline advertising"). By its very nature, such offline data includes personally identifiable information, because a common intended use is to target offline advertising, which must be directed to a particular person's mailing address or phone number. Examples of personally identifiable information include, but are not limited to, name, date of birth, residence address, phone number, email address, financial account numbers, government-issued identifiers (e.g., Social Security number or driver's license number), vehicle registration or license plate number, facial images, fingerprints, retinal scan, other biometric information, signature or other handwriting samples, or other information that can be tied to a specific individual.

Online distribution of personally identifiable information currently is limited to so-called opt-in arrangements, in which a user accessing an online site must explicitly give permission for the site to distribute the user's personally identifiable information to other entities. Merging of PII with previously collected online tracking or behavioral data is also typically limited to user opt-in arrangements. A weakness of such opt-in scenarios is their limited scale (i.e., limited coverage or penetration), because many users decline to opt in (because they do not want their identifiable information distributed). In contrast, targeting of online advertising using only information or data that is not personally identifiable can be done on an "opt-out" basis, in which user information can be used to target the online advertising unless the user explicitly refuses permission for the online site to use the information. Such opt-out scenarios are more valuable commercially, because a substantially larger fraction of users (as compared to those who will affirmatively opt in) will decline to opt out, thereby allowing the use of information that is not personally identifiable. The ability to opt out can be made explicitly available by an accessed or redirect server, as is done currently by major online site operators and online advertising companies through a voluntary industry initiative. A user, by deleting or disabling cookies on the computer, can effectively prevent or at least limit targeting of ads based on data collected by the online entities that placed the cookies.

DESCRIPTION

To enable targeting of online advertisements based on offline data without impermissible or undesirable association of online activity with personally identifiable information (i.e., in an opt-out arrangement), a method can be performed using one or more servers under the control of an ISP, wherein: (a) one or more of the servers receive from a requesting server an electronic transmission of an IP address and a time and date; (b) one or more of the servers automatically determine to which subscriber of the ISP the received IP address was allocated at the received time and date; and (c) the ISP automatically transmits an electronic communication that causes delivery to the requesting server of offline data originating from an offline data provider. The delivered offline data concern the subscriber determined to have been allocated the received IP address at the received time and date.

In a preferred method, the subscriber's privacy is maintained at several stages. In step (a), the electronic transmission received by the ISP server includes only an identification of the subscriber's computer or access device that was used to access a requesting online server (e.g., a server of an online site accessed by the subscriber) or that was redirected to a requesting redirect server. Such identification includes at least the IP/T/D for the access or redirect, and it can also include a further identifier such as a cookie identifier. The transmission to the ISP server can comprise a transmission from the requesting server, or can comprise a redirect of the subscriber's computer to the ISP server. No information concerning the subscriber's history of online activity needs to be transmitted to the ISP server or to the offline data provider.

In step (b), the ISP server can automatically search its own log files to determine to which of its subscribers the specified IP address was allocated at the specified time and date. The ISP need not probe further to determine what online activity was performed using that IP address (and is currently prohibited by industry and public policy from doing so without opt-in by the subscriber). Arranging transmission of offline data in part (c) by the ISP can include transmission to the offline data provider of the subscriber's name (and perhaps the subscriber's address, phone number, or other confirmatory information), but does not include transmission to the offline data provider of information concerning the history of online activity via the online access provided to the subscriber by the ISP.

The offline data provider can transmit offline data pertaining to the subscriber (determined by the ISP to have been allocated the received IP address), as is permitted by current law and policy. Offline data that is transmitted to a requesting online server preferably does not include personally identifiable information. The offline data can be electronically transmitted directly to the requesting server (i.e., without being transmitted by the ISP) or can be electronically transmitted to an ISP server that in turn electronically transmits the offline data to the requesting server. Personally identifiable information can be stripped by the offline data provider (or not included in the first place) or stripped by the ISP server (if retransmitted). The transmitted offline data (free of personally identifiable information) is identified to the requesting online server by the IP/T/D that was included in the transmission in step (a) or by a corresponding identifier (as described below). The requesting online server is therefore provided with access to some of the subscriber's offline data, such as to enable better targeting of online advertisements to the subscriber, who nevertheless remains anonymous to the requesting online site (i.e., not personally identifiable).

A goal of the method is to couple offline data concerning a computer user (e.g., an ISP subscriber) with a particular computer used to access an online site, without compromising the privacy of the computer user (e.g., without linking the user's personal identity to the user's history of online activity, such as the user's online browsing history). The server hosting an accessed online site identifies a computer and its online activity, but not the user (unless, of course, the user supplies the online site with his or her identity in an opt-in arrangement). The offline data provider can provide offline data concerning a personally identified user but has no information concerning the user's history of online activity. The ISP has access to the user's IP address at any given time and the user's personal identity, and uses only that information to enable transmission of the user's offline data (the portion that is not personally identifiable) to be linked by the requesting server to the user's history of online activity, without compromising the user's privacy or personal identity. No single one of those entities has in its possession the user's personal identity, the user's online access or computer identifier, the user's history of online activity, and the user's offline data. Although it is true that the ISP could gain access to all of that information (including the user's history of online activity) if the ISP were to collect detailed information concerning the user's online activity, such is currently prohibited by industry and public policy in the absence of user opt-in.

After receiving an IP/T/D, there are a number of ways that the ISP can arrange transmission of the offline data from the offline data provider to a requesting server. First, the ISP can receive the offline data from the offline data provider (ahead of time or in response to receiving the IP/T/D) and then transmit the offline data to the requesting server (without personally identifying the subscriber to the requesting server). The offline data provider need not be provided with any online identifier or IP address for the subscriber. The offline data received by the ISP from the offline data provider typically includes personally identifiable information (e.g., the subscriber's name), and in fact the ISP already has personally identifiable information. However, typically no personally identifiable information is transmitted to the requesting online server (unless perhaps the subscriber has opted-in to provide the information to the requesting server). The transmission of the offline data to the requesting server can occur automatically in response to receiving the IP/T/D or a subsequent transmission of offline data from the offline data provider. Subsequent transmission of offline data from the offline data provider (i.e., after the ISP receives the IP/T/D) can occur in response to a transmission from the ISP to the offline data provider that personally identifies the subscriber. That transmission can further include a request for the offline data, or the offline data can be transmitted by the offline data provider in accordance with a prearrangement between the ISP and the offline data provider (e.g., the offline data provider transmits offline data to the ISP upon receiving the name of a subscriber transmitted by the ISP, without a specific request for that data being included in the transmission).

Second, the offline data can be transmitted by the offline data provider to the requesting server without transmission by the ISP. The transmission by the offline data provider can occur automatically in response to a transmission from the ISP to the offline data provider that personally identifies the subscriber, and can include or be associated with instructions to transmit the offline data to the requesting server. The instructions can comprise a prearrangement between the ISP and the offline data provider (e.g., the offline data provider transmits offline data to the requesting server upon receiving the name of a subscriber transmitted by the ISP, without a specific request for that data being included in the transmission). The transmission can further include an identifier of the requesting server to enable the offline data provider to transmit the offline data to the correct one of multiple requesting servers.

The offline data should be recognizable by both the requesting server and the offline data provider as concerning the same subscriber, but without revealing personally identifiable information to the requesting server or revealing online activity to the offline data provider. One or more identifiers associated with the offline data can be employed to achieve that mutual recognition. In one example, an online identifier in addition to the IP/T/D (e.g., a cookie identifier) can be generated by the requesting server and transmitted to the ISP along with the IP/T/D. That additional identifier can be transmitted from the ISP to the offline data provider (without the IP/T/D) and then included in or associated with a transmission of the offline data from the offline data provider to the requesting server. In another example, an identifier that does not include personally identifiable information (i.e., an offline data identifier) can be transmitted by the ISP to the requesting server. That identifier can be generated by the ISP and transmitted to the offline data provider, or generated by and received from the offline data provider. The offline data identifier can then be included in or associated with a transmission of the offline data from the offline data provider to the requesting server.

Other examples of offline data transmission from the offline data provider to the requesting server can include the IP/T/D being provided to the offline data provider, and may therefore require subscriber opt-in. In one such example, the IP/T/D transmitted by the requesting server can be transmitted to the offline data provider; the IP/T/D can then be included in or associated with a transmission of the offline data from the offline data provider to the requesting server. In another such example, the ISP requests offline data and the requesting server redirects the subscriber computer to a server of the offline data provider to provide access to offline data that is not personally identifiable. Such a redirect effectively provides the subscriber IP address to the offline data provider.

Acquisition of offline data about its subscribers can be performed by the ISP in response to requests received (e.g., received IP/T/D) from online servers or redirect servers. Alternatively, the ISP can acquire offline data about its subscribers ahead of time from the offline data provider. The ISP can store a database of such offline data and transmit portions of that database (without personally identifying the subscribers) in response to requests from online or redirect servers. The offline data can be updated periodically or intermittently by subsequent acquisition from the offline data provider.

The requesting server can use the offline data in a variety of ways. It can use the data to target online advertising to the corresponding subscriber during the subscriber's current online session or during a future online session. The requesting server can further distribute the offline data (without personally identifiable information) to other online servers, typically via a redirect of the subscriber's computer. The other online servers can use the offline data for targeting online advertising. In addition, the requesting server or the other online servers can use the offline data for targeting television advertising according to the teachings of application Ser. No. 11/736,544 filed Apr. 17, 2007, application Ser. No. 11/968,117 filed Dec. 31, 2007, and Ser. No. 12/257,386 filed Oct. 23, 2008, each of which is hereby incorporated by reference as if fully set forth herein.

The disclosed methods can include any suitable or desired flow of advertising revenue. Examples include but are not limited to (i) payment by an entity controlling the requesting server to the ISP or to the offline data provider in return for the offline data; (ii) receipt by that entity of revenue from other online advertising entities in return for distributing the offline data; (iii) payment by the ISP to the offline data provider in return for the offline data; or (iv) payment by the offline provider to the ISP in return for identifying the ISP's subscribers to the offline data provider or distributing the offline data to online advertising entities.

In some circumstances it may be considered desirable for the ISP to avoid, or to be denied, access to the user's offline data that is retransmitted by the ISP. If that is desired, an encoding or encryption scheme can be developed and employed by the requesting online site and the offline data provider for transmitting those portions of the offline data that are not personally identifiable to the requesting online site via the ISP. The ISP is not given a key for decoding or decrypting that portion of the offline data, and so it does not have access to the data as it is relayed by the ISP. Any suitable encoding or encryption protocol can be employed.

Any individual step in the method, independent of the others, can be performed (i) for each individual online access user about whom offline data is desired (e.g., by redirecting each user's computer); (ii) for multiple online access users once an accessed or redirect online site has accumulated a predetermined number of users about whom offline data is desired (e.g., every 50 users or every 1000 users, such as by transmitting a log file); or (iii) for multiple online access users about whom offline data is desired once a predetermined period of time has passed (e.g., every two hours or every 24 hours, such as by transmitting a log file).

Any of the various transmissions of requests or data can be achieved in any suitable way, independent of the others, including but not limited to digital transmission via a computer network or phone (wired or wireless), digital transmission via recordable media (e.g., magnetic or optical discs, magnetic tape, solid state media), analog transmission (wired or wireless), or transmission by any suitable delivery method of printed hard copies. It is preferred to use automated electronic data transmission controlled by suitably programmed computers, servers, or other machines. For example, logging of the allocation of IP addresses by the ISP is typically done using one or more computers or servers programmed for that purpose.

The IP address used in the disclosed methods can be static or dynamic (e.g., assigned using the Dynamic Host Configuration Protocol a/k/a DHCP). The IP address can be associated with a specific computer or other online user interface, or the IP address can be associated with a modem, router, or other online access device so that multiple online user interface devices might share a common IP address when accessing online sites. The IP address can be a 32-bit IP address assigned according to the IPv4 protocol, a 128-bit address assigned according to the IPv6 protocol, or any other suitable address assigned under a future-developed protocol.

The online user interface device can comprise any user interface device used to access a remote network such as the Internet, including but not limited to a cell phone or mobile handset, a personal digital assistant (PDA), or a networked computer (desktop, workstation, notebook, laptop, or other). Use of the phrases "user's computer" or "subscriber's computer" is intended to indicate a networked computer or any other suitable online user interface device.

The online access device can comprise any device used to connect an online user interface device to a remote network such as the Internet, including but not limited to a modem, a wired or wireless router, a wireless access point, a wired network adapter (e.g., Ethernet adapter), a wireless network adapter (e.g., IEEE 802.11, Wi-Fi, WiMax, ED-VO, EDGE, HSPA, CDMA, GSM, or other), or an optical fiber based network adapter (e.g., a network interface unit or optical network terminal). Different types of online access devices can be, and sometimes are, combined into a single unit (e.g., a modem that also functions as a router for a LAN). An online user interface device and an online access device can be, and sometimes are, combined into a single unit (e.g., a computer with a built-in Ethernet adapter, wireless adapter, or modem).

A subscriber is a user who has established online access through an arrangement with an ISP, usually in return for a periodic subscription fee. The ISP has personally identifiable information for its subscribers that typically includes at least a name, billing address, and service address for the online access (unless the access is mobile), and can also include a phone number, email address, and bank or credit card information. The offline data transmitted by the offline data provider includes data pertaining to at least the subscriber. However, because multiple people might live in a common household or work in a common business establishment, the offline data provider can include in its transmission to the requesting online server offline data (not personally identifiable) that pertains to people other than the subscriber. For example, the offline data can include information about the number or ages of children in a household, or information about a spouse or parent in the household. In another example, the offline data can include information about a business or its employees if the subscriber is a business or a business owner.

The systems and methods disclosed herein can be implemented as general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in temporary or permanent storage or in replaceable media, such as by including programming in microcode, object-oriented code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future storage alternatives.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. A method performed using one or more computers, wherein the one or more computers has access to electronic data containing personal identities of users of respective online user interface devices, and wherein an entity controlling the one or more computers has access to certain online activity performed using the online user interface device through an Internet connection, the method comprising:

(a) receiving at one or more of the computers from a requesting server an electronic transmission of an IP address and a time and date corresponding to online access or an online redirect to the requesting server via an online access device of a user;

(b) automatically determining, using one or more of the computers, to which of the users the IP address received in part (a) was associated at the time and date received in part (a); and (c) automatically electronically directing, from one or more of the computers to the requesting server, offline data originating from an offline data provider, which offline data concern the user determined in part (b) and were received from the offline data provider before the IP address, time, and date were received in part (a), and which directing and which offline data do not convey to the requesting server a personal identity of the user determined in part (b).

2. The method of claim 1 wherein the acts of parts (b) and (c) are performed without associating a history of online activity to which the entity has access, which online activity is performed by the user determined in part (b), with a personal identity of the user determined in part (b).

3. The method of claim 1 further comprising, before the IP address, time, and date were received in part (a), automatically electronically directing, from one or more of the computers to the offline data provider, information personally identifying the user who is later determined according to part (b), without conveying to the offline data provider information pertaining to a history of the online activity to which the entity has access, and in response receiving from the offline data provider the offline data later directed to the requesting server according to part (c).

4. The method of claim 1 wherein the IP address received from the requesting server is associated with the online user interface device of the user and at least one other online user interface device of the user.

5. A system comprising one or more computers, wherein the one or more computers has access to electronic data containing personal identities of users of respective online user interface devices, and wherein an entity controlling the one or more computers has access to certain online activity performed using the online user interface device through an Internet connection, wherein the one or more computers are structured and connected to:

(a) receive at one or more of the computers from a requesting server an electronic transmission of an IP address and a time and date corresponding to online access or an online redirect to the requesting server via an online access device of a user;

(b) determine automatically, using one or more of the computers, to which of the users the IP address received in part (a) was associated at the time and date received in part (a); and (c) automatically electronically direct, from one or more of the computers to the requesting server, offline data originating from an offline data provider, which offline data concern the user determined in part (b) and were received from the offline data provider before the IP address, time, and date were received in part (a), and which directing and which offline data do not convey to the requesting server a personal identity of the user determined in part (b).

6. The system of claim 5 wherein the one or more computers are structured and connected to perform the acts of parts (b) and (c) without associating a history of online activity to which the entity has access, which online activity is performed by the user determined in part (b), with a personal identity of the user determined in part (b).

7. The system of claim 5 wherein the one or more computers are further structured and connected to, before the IP address, time, and date were received in part (a), automatically electronically direct, from one or more of the computers to the offline data provider, information personally identifying the user who is later determined according to part (b), without conveying to the offline data provider information pertaining to a history of the online activity to which the entity has access, and in response to receive from the offline data provider the offline data later directed to the requesting server according to part (c).

8. The system of claim 5 wherein the IP address received from the requesting server is associated with the online user interface device of the user and at least one other online user interface device of the user.

9. An article comprising a non-transitory tangible medium encoding computer-readable instructions that, when applied to one or more computers that have access to electronic data containing personal identities of users of respective online user interface devices and are controlled by an entity that has access to certain online activity performed using the online user interface device through an Internet connection, instruct one or more of the computers to:
  (a) receive at one or more of the computers from a requesting server an electronic transmission of an IP address and a time and date corresponding to online access or an online redirect to the requesting server via an online access device of a user;
  (b) determine automatically, using one or more of the computers, to which of the users the IP address received in part (a) was associated at the time and date received in part (a); and
  (c) automatically electronically direct, from one or more of the computers to the requesting server, offline data originating from an offline data provider, which offline data concern the user determined in part (b) and were received from the offline data provider before the IP address, time, and date were received in part (a), and which directing and which offline data do not convey to the requesting server a personal identity of the user determined in part (b).

10. The medium of claim 9 wherein the encoded instructions instruct the one or more of the computers to perform the acts of parts (b) and (c) without associating a history of online activity to which the entity has access, which online activity is performed by the user determined in part (b), with a personal identity of the user determined in part (b).

11. The medium of claim 9 wherein the encoded instructions further instruct the one or more computers to, before the IP address, time, and date were received in part (a), automatically electronically direct, from one or more of the computers to the offline data provider, information personally identifying the user who is later determined according to part (b), without conveying to the offline data provider information pertaining to a history of the online activity to which the entity has access, and in response to receive from the offline data provider the offline data later directed to the requesting server according to part (c).

12. The medium of claim 9 wherein the IP address received from the requesting server is associated with the online user interface device of the user and at least one other online user interface device of the user.

* * * * *